(12) United States Patent  (10) Patent No.: US 8,677,359 B1
Cavage et al.  (45) Date of Patent: Mar. 18, 2014

(54) COMPUTE-CENTRIC OBJECT STORES AND METHODS OF USE

(71) Applicants: Mark Cavage, Seattle, WA (US); David Pacheco, San Francisco, CA (US); Bryan Cantrill, Piedmont, CA (US)

(72) Inventors: Mark Cavage, Seattle, WA (US); David Pacheco, San Francisco, CA (US); Bryan Cantrill, Piedmont, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/831,386

(22) Filed: Mar. 14, 2013

(51) Int. Cl.
*G06F 9/455* (2006.01)
*G06F 9/46* (2006.01)

(52) U.S. Cl.
USPC ............................................. 718/1; 718/104

(58) Field of Classification Search
None
See application file for complete search history.

(56) References Cited

U.S. PATENT DOCUMENTS

| | | | |
|---|---|---|---|
| 6,393,495 | B1 | 5/2002 | Flory et al. |
| 6,553,391 | B1 | 4/2003 | Goldring et al. |
| 7,222,345 | B2 | 5/2007 | Gray et al. |
| 7,265,754 | B2 | 9/2007 | Brauss |
| 7,379,994 | B2 | 5/2008 | Collazo |
| 7,437,730 | B2 | 10/2008 | Goyal |
| 7,529,780 | B1 | 5/2009 | Braginsky et al. |
| 7,581,219 | B2 * | 8/2009 | Neiger et al. ..................... 718/1 |
| 7,603,671 | B2 | 10/2009 | Liu |
| 7,640,547 | B2 | 12/2009 | Neiman et al. |
| 7,774,457 | B1 | 8/2010 | Talwar et al. |
| 7,814,465 | B2 | 10/2010 | Liu |
| 7,849,111 | B2 | 12/2010 | Huffman et al. |
| 7,899,901 | B1 | 3/2011 | Njemanze et al. |
| 7,904,540 | B2 | 3/2011 | Hadad et al. |
| 7,917,599 | B1 | 3/2011 | Gopalan et al. |
| 7,933,870 | B1 | 4/2011 | Webster |
| 7,940,271 | B2 | 5/2011 | Wright et al. |
| 8,006,079 | B2 * | 8/2011 | Goodson et al. .................. 713/1 |
| 8,010,498 | B2 | 8/2011 | Gounares et al. |
| 8,141,090 | B1 | 3/2012 | Graupner et al. |
| 8,181,182 | B1 * | 5/2012 | Martin ........................ 718/104 |
| 8,301,746 | B2 | 10/2012 | Head et al. |
| 8,336,051 | B2 | 12/2012 | Gokulakannan |
| 8,370,936 | B2 | 2/2013 | Zuk et al. |
| 8,417,673 | B2 | 4/2013 | Stakutis et al. |
| 8,417,746 | B1 | 4/2013 | Gillett, Jr. et al. |
| 8,429,282 | B1 | 4/2013 | Ahuja et al. |
| 8,434,081 | B2 * | 4/2013 | Cervantes et al. ................ 718/1 |
| 8,464,251 | B2 | 6/2013 | Sahita et al. |

(Continued)

FOREIGN PATENT DOCUMENTS

WO  2011/088224  7/2011

OTHER PUBLICATIONS

International Search Report, May 19, 2011, PCT/US2011/028234, filed Mar. 11, 2011.

(Continued)

*Primary Examiner* — Van Nguyen
(74) *Attorney, Agent, or Firm* — Carr & Ferrell LLP (57) ABSTRACT

Systems and methods for providing a compute-centric object store. An exemplary method may include receiving a request to perform a compute operation on at least a portion of an object store from a first user, the request identifying parameters of the compute operation, assigning virtual operating system containers to the objects of the object store from a pool of virtual operating system containers. The virtual operating system containers may perform the compute operation on the objects according to the identified parameters of the request. The method may also include clearing the virtual operating system containers and returning the virtual operating system containers to the pool.

19 Claims, 7 Drawing Sheets

(56) References Cited

U.S. PATENT DOCUMENTS

| | | |
|---|---|---|
| 2002/0069356 A1 | 6/2002 | Kim |
| 2002/0082856 A1 | 6/2002 | Gray et al. |
| 2002/0156767 A1 | 10/2002 | Costa et al. |
| 2002/0198995 A1 | 12/2002 | Liu et al. |
| 2003/0154112 A1 | 8/2003 | Neiman et al. |
| 2003/0163596 A1 | 8/2003 | Halter et al. |
| 2004/0088293 A1 | 5/2004 | Daggett |
| 2005/0108712 A1 | 5/2005 | Goyal |
| 2005/0188075 A1 | 8/2005 | Dias et al. |
| 2006/0107087 A1 | 5/2006 | Sieroka et al. |
| 2006/0153174 A1 | 7/2006 | Towns-von Stauber et al. |
| 2006/0218285 A1 | 9/2006 | Talwar et al. |
| 2006/0246879 A1 | 11/2006 | Miller et al. |
| 2006/0294579 A1 | 12/2006 | Khuti et al. |
| 2007/0088703 A1 | 4/2007 | Kasiolas et al. |
| 2007/0118653 A1 | 5/2007 | Bindal |
| 2007/0168336 A1 | 7/2007 | Ransil et al. |
| 2007/0179955 A1 | 8/2007 | Croft et al. |
| 2007/0250838 A1 | 10/2007 | Belady et al. |
| 2007/0271570 A1 | 11/2007 | Brown et al. |
| 2008/0080396 A1 | 4/2008 | Meijer et al. |
| 2008/0103861 A1 | 5/2008 | Zhong |
| 2008/0155110 A1 | 6/2008 | Morris |
| 2009/0044188 A1 | 2/2009 | Kanai et al. |
| 2009/0077235 A1 | 3/2009 | Podila |
| 2009/0164990 A1 | 6/2009 | Ben-Yehuda et al. |
| 2009/0193410 A1 | 7/2009 | Arthursson et al. |
| 2009/0216910 A1 | 8/2009 | Duchesneau |
| 2009/0259345 A1 | 10/2009 | Kato et al. |
| 2009/0260007 A1 | 10/2009 | Beaty et al. |
| 2009/0300210 A1 | 12/2009 | Ferris |
| 2010/0050172 A1 | 2/2010 | Ferris |
| 2010/0057913 A1 | 3/2010 | DeHaan |
| 2010/0106820 A1 | 4/2010 | Gulati et al. |
| 2010/0125845 A1 | 5/2010 | Sugumar et al. |
| 2010/0131324 A1 | 5/2010 | Ferris |
| 2010/0153958 A1 | 6/2010 | Richards et al. |
| 2010/0162259 A1 | 6/2010 | Koh et al. |
| 2010/0223383 A1 | 9/2010 | Salevan et al. |
| 2010/0223385 A1 | 9/2010 | Gulley et al. |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0299313 A1 | 11/2010 | Orsini et al. |
| 2010/0306765 A1 | 12/2010 | DeHaan |
| 2010/0306767 A1 | 12/2010 | DeHaan |
| 2010/0318609 A1 | 12/2010 | Lahiri et al. |
| 2010/0332629 A1 | 12/2010 | Cotugno et al. |
| 2010/0333087 A1 | 12/2010 | Vaidyanathan et al. |
| 2011/0004566 A1 | 1/2011 | Berkowitz et al. |
| 2011/0016214 A1 | 1/2011 | Jackson |
| 2011/0029969 A1 | 2/2011 | Venkataraja et al. |
| 2011/0029970 A1 | 2/2011 | Arasaratnam |
| 2011/0047315 A1 | 2/2011 | De Dinechin et al. |
| 2011/0055396 A1 | 3/2011 | DeHaan |
| 2011/0078303 A1 | 3/2011 | Li et al. |
| 2011/0107332 A1 | 5/2011 | Bash |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0138441 A1 | 6/2011 | Neystadt et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0173470 A1 | 7/2011 | Tran |
| 2011/0179132 A1 | 7/2011 | Mayo et al. |
| 2011/0179134 A1 | 7/2011 | Mayo et al. |
| 2011/0179162 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0320520 A1 | 12/2011 | Jain |
| 2012/0017210 A1 | 1/2012 | Huggins et al. |
| 2012/0060172 A1 | 3/2012 | Abouzour |
| 2012/0066682 A1 | 3/2012 | Al-Aziz et al. |
| 2012/0089980 A1 | 4/2012 | Sharp et al. |
| 2012/0131591 A1 | 5/2012 | Moorthi et al. |
| 2012/0159507 A1 | 6/2012 | Kwon et al. |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0198442 A1* | 8/2012 | Kashyap et al. ............... 718/1 |
| 2012/0204176 A1 | 8/2012 | Tian et al. |
| 2012/0221845 A1 | 8/2012 | Ferris |
| 2012/0303773 A1 | 11/2012 | Rodrigues |
| 2012/0311012 A1 | 12/2012 | Mazhar et al. |
| 2013/0067067 A1 | 3/2013 | Miri et al. |
| 2013/0081016 A1 | 3/2013 | Saito et al. |
| 2013/0086590 A1 | 4/2013 | Morris et al. |
| 2013/0129068 A1 | 5/2013 | Lawson et al. |
| 2013/0132057 A1 | 5/2013 | Deng et al. |
| 2013/0179881 A1 | 7/2013 | Calder et al. |
| 2013/0191836 A1 | 7/2013 | Meyer |
| 2013/0346974 A1 | 12/2013 | Hoffman et al. |

OTHER PUBLICATIONS

Non-Final Office Action, Dec. 10, 2012, U.S. Appl. No. 13/046,647, filed Mar. 11, 2011.

International Search Report, May 5, 2011, PCT/US2011/028230, filed Mar. 11, 2011.

Notice of Allowance, Aug. 12, 2012, U.S. Appl. No. 12/696,802, filed Jan. 29, 2010.

Non-Final Office Action, Mar. 27, 2012, U.S. Appl. No. 12/696,802, filed Jan. 29, 2010.

Non-Final Office Action, Mar. 2, 2011, U.S. Appl. No. 12/696,619, filed Jan. 29, 2010.

Final Office Action, Jul. 11, 2011, U.S. Appl. No. 12/696,619, filed Jan. 29, 2010.

Non-Final Office Action, May 29, 2012, U.S. Appl. No. 12/696,619, filed Jan. 29, 2010.

Non-Final Office Action, Sep. 6, 2011, U.S. Appl. No. 12/696,334, filed Jan. 29, 2010.

Final Office Action, Jul. 6, 2012, U.S. Appl. No. 12/696,334, filed Jan. 29, 2010.

International Search Report, Sep. 1, 2011, PCT/US2011/021157, filed Jan. 13, 2011.

Non-Final Office Action, Apr. 12, 2012, U.S. Appl. No. 13/340,461, filed Dec. 29, 2011.

Final Office Action, Nov. 19, 2012, U.S. Appl. No. 13/340,461, filed Dec. 29, 2011.

Notice of Allowance, Feb. 8, 2013, U.S. Appl. No. 13/340,461, filed Dec. 29, 2011.

Non-Final Office Action, Mar. 20, 2012, U.S. Appl. No. 13/340,488, filed Dec. 29, 2011.

Final Office Action, Aug. 15, 2012, U.S. Appl. No. 13/340,488, filed Dec. 29, 2011.

Bi et al. "Dynamic Provisioning Modeling for Virtualized Multi-tier Applications in Cloud Data Center". 2010 IEEE 3rd International Conference on Cloud Computing. pp. 370-377.

Chappell, David. "Introducing Windows Azure". Microsoft Corporation. Oct. 2010. pp. 1-25.

Non-Final Office Action, Sep. 9, 2013, U.S. Appl. No. 13/831,349, filed Mar. 14, 2013.

Non-Final Office Action, Sep. 9, 2013, U.S. Appl. No. 13/836,599, filed Mar. 15, 2013.

Non-Final Office Action, Oct. 4, 2013, U.S. Appl. No. 13/831,292, filed Mar. 14, 2013.

Non-Final Office Action, Sep. 13, 2013, U.S. Appl. No. 13/830,913, filed Mar. 14, 2013.

Non-Final Office Action, Oct. 4, 2013, U.S. Appl. No. 13/963,964, filed Aug. 9, 2013.

(56) References Cited

OTHER PUBLICATIONS

Yagoubi, Belabbas et al., "Load Balancing in Grid Computing," Asian Journal of Information Technology, vol. 5, No. 10, pp. 1095-1103, 2006.

Kramer, "Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, p. 328-336.

Gregg, Brendan, "Visualizing System Latency," May 1, 2010, ACM Queue, p. 1-13, http://queue.acm.org/detail.cfm?id=1809426.

Gregg, Brendan, "Heat Map Analytics," Mar. 17, 2009, Oracle, p. 1-7, https://blogs.oracle.com/brendan/entry/heat_map_analytics.

Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.

* cited by examiner

COMPUTE-CENTRIC OBJECT STORES AND METHODS OF USE

FIELD OF THE PRESENT TECHNOLOGY

The present technology relates generally to compute-centric object stores and methods of using the same. The compute-centric object stores of the present technology provide multi-tenancy by assigning guest virtual operating system containers to a plurality of users (e.g., tenants). The virtual operating system containers are assigned and managed by a global or "host" operating system kernel that operates on a physical machine.

BACKGROUND

Various methods and systems for providing multitenant computing systems, such as cloud computing, have been attempted. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Oftentimes, these cloud computing systems leverage virtual machines for their users. A virtual machine ("VM") is an emulation of a real-world computing system. Often, the virtual machine provides a user with one or more different operating systems than the operating system of the local machine ("host") that is running the virtual machine. The VM provides a complete system platform that provides the one or more operating systems. The VM is typically managed by a hypervisor that mediates computing resources of the host machine for use by the VM via hardware emulation. The use of hardware emulation is often deleterious to VM performance and efficient utilization of physical resources and, in turn, reduces the number of VMs that may run on a given host machine. Additionally, as the number of VMs on a host machine increases and they begin to operate concurrently, the hypervisor must coordinate the varying workloads of the VMs to prevent instability

SUMMARY OF THE PRESENT TECHNOLOGY

According to some embodiments, the present technology may be directed to multitenant compute-centric object storage system that comprises: (a) one or more processors; and (b) logic encoded in one or more tangible media for execution by the one or more processors and when executed operable to perform operations comprising: (i) receiving a request to perform a compute operation on at least a portion of an object store from a first user, the request identifying parameters of the compute operation and objects against which the compute operation is executed, the objects included in the object store; (ii) assigning a virtual operating system container which is mapped to objects; (iii) the virtual operating system container performing the compute operation on the objects according to the identified parameters of the request; and (iv) clearing the virtual operating system container.

According to some embodiments, the present technology may be directed to a compute-centric object storage system that comprises: (a) a hardware layer associated with: (i) one or more processors; and (ii) one or more tangible media; and (b) a host operating system kernel encoded in the one or more tangible media, the host operating system kernel being configured to: (1) provide a pool of virtual guest operating systems; (2) assign a virtual guest operating system of the pool of virtual guest operating systems to a first user; (3) map a plurality of objects for the first user to the virtual guest operating system; and (4) perform a compute operation on the plurality of objects.

According to some embodiments, the present technology may be directed to a method that comprises: (a) receiving a request to perform a compute operation on at least a portion of an object store from a first user, the request identifying parameters of the compute operation; (b) generating virtual operating system containers for the objects of the object store; (c) the virtual operating system containers being programed to perform the compute operation on the objects according to the identified parameters of the request; and (d) terminating the virtual operating system containers.

According to some embodiments, the present technology may be directed to a method that comprises: (a) receiving a request to perform a compute operation on at least a portion of an object store from a first user, the request identifying parameters of the compute operation; (b) executing an operating system process for the objects identified in the request, the operating system process performing the compute operation on the object according to the identified parameters of the request; and (c) terminating the operating system process.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Figure 1:
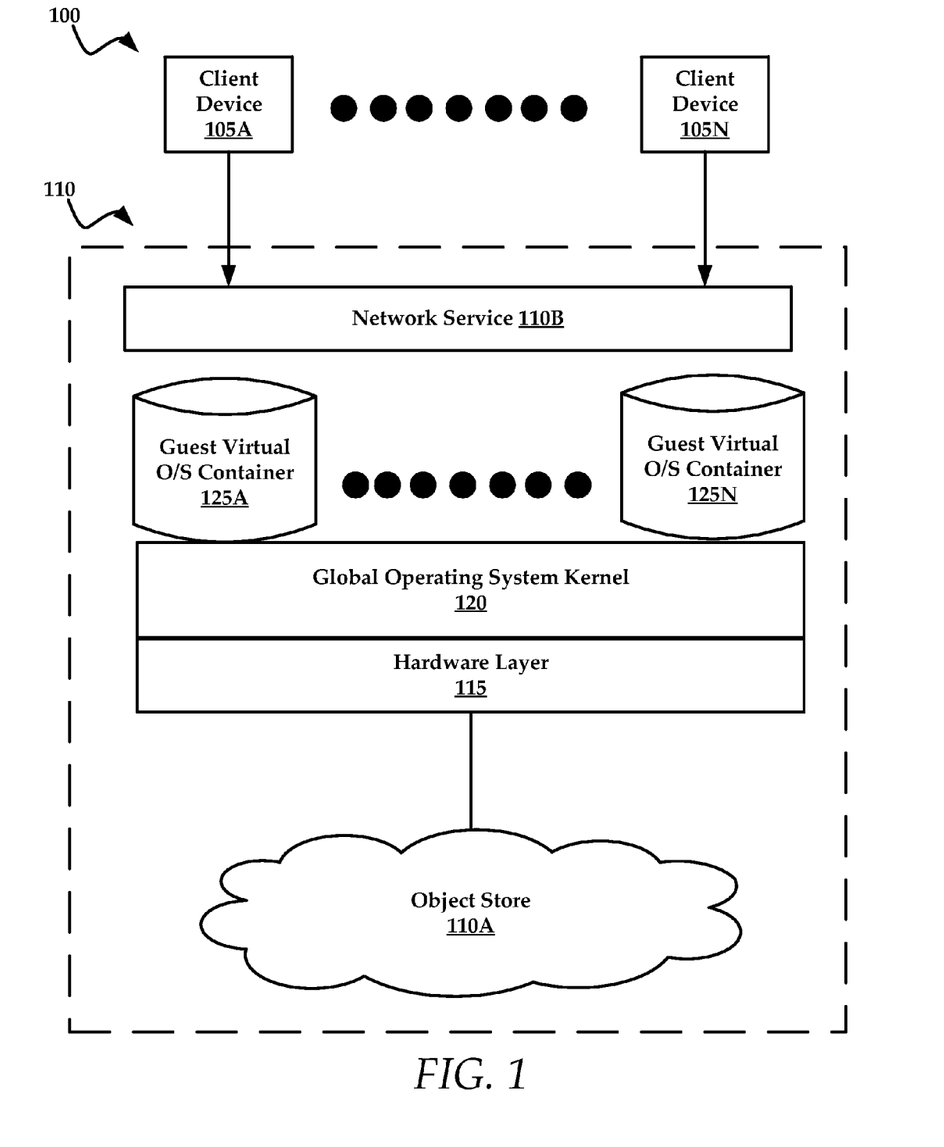
FIG. 1 is a block diagram of an exemplary architecture in which embodiments of the present technology may be practiced.

FIG. 1 is a block diagram of an exemplary architecture 100 in which embodiments of the present technology may be practiced. The architecture 100 comprises a plurality of client devices 105A-N that communicatively couple with a compute-centric object store system, hereinafter "system 110." It will be understood that the architecture 100 may include a plurality of systems, such as system 110. For the sake of brevity and clarity, a detailed description of an exemplary system 110 will be provided below, although the features of the system 110 apply equally to all of the plurality of systems. The plurality of client devices 105A-N may communicatively couple with the system 110 via any one or combination of a number of private and/or public networks, such as the Internet. According to some embodiments, the client devices 105A-N may submit requests or jobs to a network service 110B, which is a constituent part of the system 110. In some instances, the network service 110E evaluates request received from users to determine one or more physical nodes that comprise objects that correspond to the request.

In general, the system 110 comprises an object store 110A that provides "compute" as a first class citizen of an object store 110A. More specifically, compute operations (e.g., instructing the system to compute on objects in the object store) of the present technology resemble a top-level API function, similar to processes like storing or fetching objects in the object store 110A.

It will be understood that the terms "object store" comprise a network service for storing unstructured, arbitrary-sized chunks of data (objects). It will be further understood that the object store may not support modifications to existing objects, but supports full object replacement operations, although systems that support both object modification and full object replacement operations may also utilize the features of the present technology to perform compute operations directly on (e.g., in-situ) objects within the object store.

In some embodiments, the system 110 may be configured to receive a request to perform a compute operation on at least a portion of an object store, from a first user. Again, the user may be associated with one of the client devices 105A-105N. The request identifies parameters of the compute operation as well as objects against which the compute operation is executed.

In some instances, the system 110 may assign virtual operating system containers to a user, based upon a request. The system 110 may map objects to the containers that are associated with the user. Typically, these objects are identified by the user in the request. A virtual operating system container performs the compute operation on an object according to the identified parameters of the request. The system 110 may then clear the virtual operating system containers and return the virtual operating system containers to a pool of virtual operating system containers. Additional aspects of the system 110 will be described in greater detail below.

It will be understood that a compute-centric object store may be created to operate without the user of virtual operating system (global kernel) or virtual operating system containers. While such an object store would provide advantages such as in-situ computation of data (where objects are processed directly on the object store), the object store may not isolate tenants in the similarly to systems that utilize a virtual operating system and/or virtual operating system containers.

In these instances, the compute-centric object store may be configured to receiving a request to perform a compute operation on at least a portion of an object store from a first user via a network service, the request identifying parameters of the compute operation. The object store may also execute an operating system process for the objects identified in the request. The operating system process may perform the compute operation on the object according to the identified parameters of the request. Additionally, once the compute operation has been executed, the operating system process may be terminated by the virtual operating system.

The terms in-situ computation will be understood to include the execution of compute operations against objects in an object store, where the objects not moved or copied from or within the object store.

In some embodiments, the system 110 is comprised of a hardware layer 115 that provides a logical interface with at least one or more processors and a memory which stores logic that is executed by the one or more processors. Generally, the hardware layer 115 controls one or more of the hardware components of a computing system, such as the computing system 600 of FIG. 6, which will be described in greater detail below. By way of non-limiting example, the hardware layer 115 may manage the hardware components of a server blade or another similar device. The hardware layer 115 provides access to the physical hardware that services a global operating system kernel 120 that cooperates with the hardware layer 115. The global operating system kernel 120 may also be referred to as a host operating system kernel.

Generally, the global operating system kernel 120 is configured to administer and manage a pool of guest virtual operating system containers, such as containers 125A-N. The containers 125A-N may operate on a distributed object store in a multitenant manner, where multiple containers can operate on the same object store simultaneously. It will be understood that each user is assigned container from the pool, on an as-needed basis. When a container is applied to an object store the container is referred to as a tenant.

According to some embodiments, the system kernel 120 may be utilized to setup the pool of guest virtual operating system containers. The system kernel 120 may also be configured to provide a command line interpreter interface that allows users to request jobs, execute other operating system implemented applications, and interact with a virtual operating system in a manner that is substantially indistinguishable relative to an operating system executing on a bare metal device.

Generally, a job may be input by a user via a command line interpreter, such as a Unix shell terminal. More specifically, the user may express a computation using the same language as the language used by a Unix shell terminal. The actual request is submitted to the network service 110B. Indeed, a request may be submitted as an HTTP request to the network service 110B. The body of the request describes the computation to perform in terms of what commands are input into the command line interpreter, which is running within a container. Contrastingly systems that utilize multiple VMs that each comprises an operating system kernel, which are managed by a hypervisor, often require users to construct complex programs or scripts to perform compute operations. Compute operations for traditional VM systems require complex programming due to a complex framework that is used by the hypervisor to coordinate hardware emulation for each of the VMs.

Figure 3:
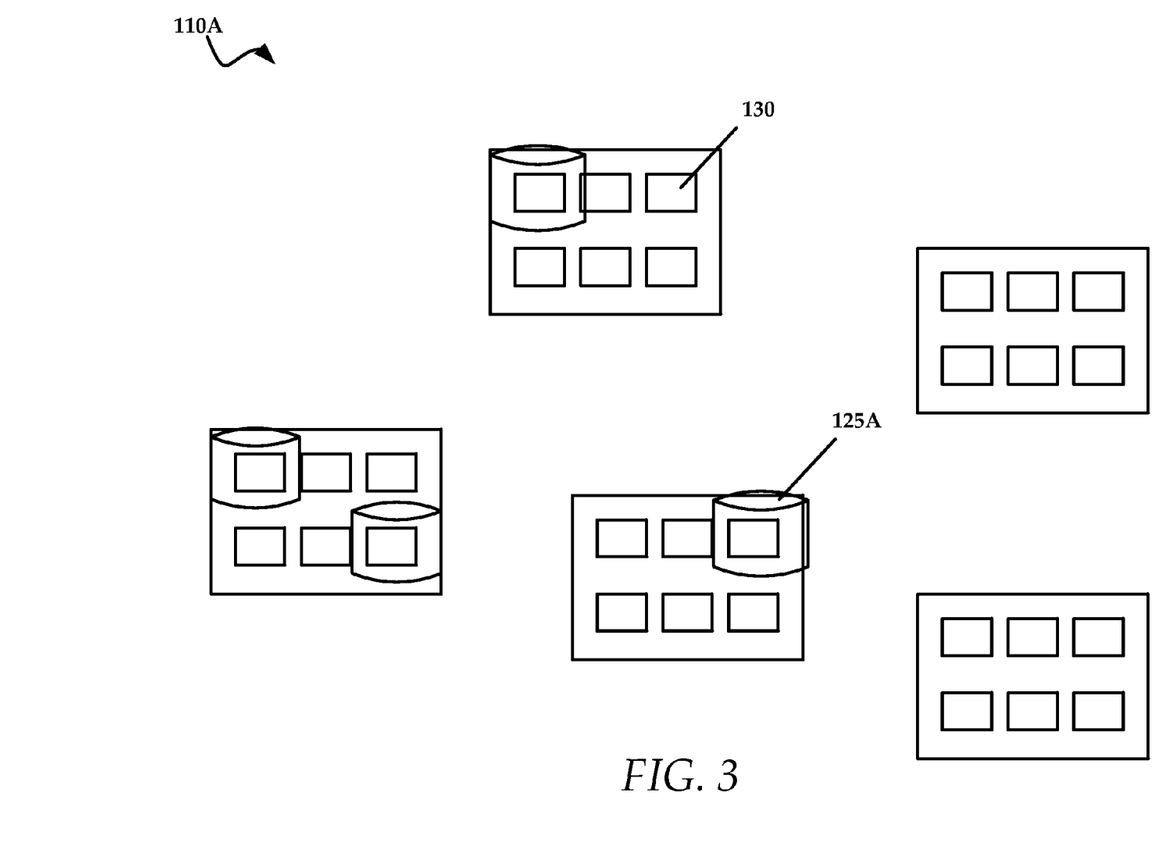
FIG. 3 is a schematic diagram illustrating the colocation of guest virtual operating system containers as multiple tenants on an object store.

Using the command line interpreter interface, the user may specify one or more desired compute operations that are to be executed against objects (such as object 130) within an object store 110A (see FIG. 3). It is noteworthy that the object store 110A may include, for example, a local or distributed object store that maintains contiguous blobs, blocks, or chunks of data. It will be understood that the objects stored in the object store 110A are complete objects, such as files or other similar data structures. Moreover, the compute operations executed against the object store 110A may be performed in such a way that partial stores of data are avoided.

In order to perform compute operations on objects for multiple users, the system kernel 120 may collocate containers 125A-N onto the object store 110A, and execute the containers 125A-N simultaneously. In FIG. 3, a plurality of containers, such as container 125A has been placed onto each of a plurality of objects within the object store 110A. Thus, a virtual operating system container is assigned to each of the plurality of objects specified in the user request. Most frequently, the assignment of a single container to a single object occurs when the system executes a "map" phase operation. The details of map and reduce phases provide by the system 110 will be described in greater detail below.

Broadly speaking, a virtual operating system container may be a lightweight virtualization solution offering a complete and secure user environment that operates on a single global kernel (system kernel 120), providing performance characteristics that are similar to operating systems that operate on bare metal devices. That is, a virtual machine operates on emulated hardware and is subject to control by a hypervisor, which produces computing inefficiencies. A virtual operating system container may operate without the computing inefficiencies of a typical virtual machine.

In some instances, the system kernel 120 may utilize a KVM (Kernel Virtual Machine) that improves the efficiency of the a virtual operating system, such as the global operating system kernel, by leveraging central processing unit (CPU) virtualization extensions to eliminate a substantial majority of the binary translation (i.e., hardware emulation) that are frequently required by VMs.

Figure 2:
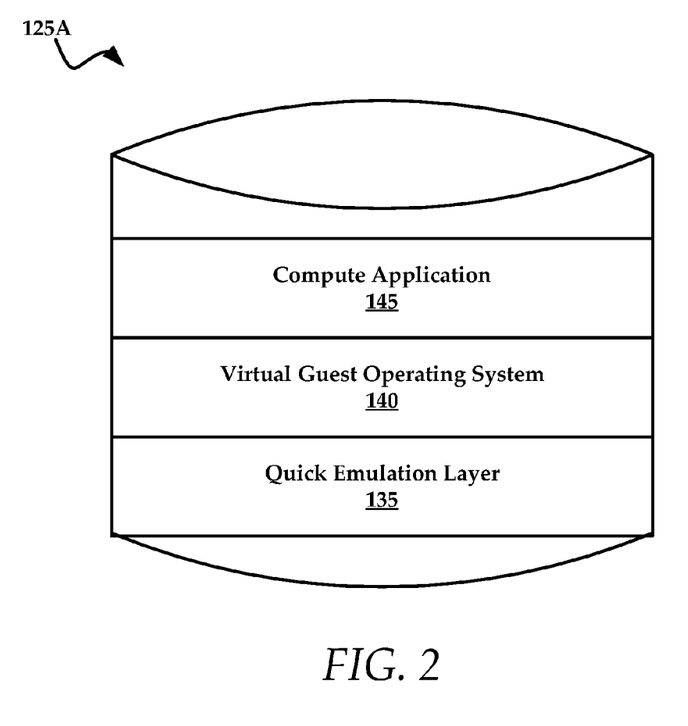
FIG. 2 is a schematic diagram of an exemplary guest virtual operating system container.

Turning to FIG. 2, an exemplary virtual operating system container 125A (FIG. 1) is shown as comprising a quick emulation layer (QEMU) 135, a virtual guest operating system 140, and a compute application 145 that is managed by the virtual guest operating system 140. The QEMU 135 provides hardware emulation and is also a VMM (virtual machine monitor). It is noteworthy that in some embodiments the QEMU 135 is not a strict hypervisor layer, but rather each QEMU 135 may be independent in some exemplary embodiments. That is, there may be one QEMU 135 one per container instead of a single QEMU 135 supporting several VMs. Advantageously, the operations of both a VM and a VMM may be combined into the QEMU 135.

According to some embodiments, the compute application 145 that is executed may include a primitive O/S compute operation. Exemplary compute operations may include operating system primitive operations, such as query, word count, send, receive, and so forth. Additionally, the operations may comprise more sophisticated operations, such as operations that include audio or video transcoding. Additionally, in some instances, users may store programs or applications in the object store itself. Users may then execute the programs as a part of a compute operation.

In some instances the compute operations may include one or more phases such as a map phase, followed by a reduce phase. Generally, a map phase may include an operation that is executed against each of a plurality of objects individually, by a plurality of containers. In some instances, a unique container is assigned to each object that is to be processed.

In contrast, a reduce phase may be executed by a single container against a plurality of objects in a batch manner. Using an example such as word count, it will be assumed that the objects of the object store 110A may comprise text files. The compute application 145 may execute a map phase to count the words in each of the text files. The output of the compute application 145 may be stored in a plurality of output objects that are stored in the object store 110A. A compute application 145 of another container may execute a reduce phase that sums the output objects of the map phase and generates a word count for all objects within the object store 110A.

It will be understood that the system kernel 120 may schedule and coordinate various compute operations (and phases) performed by the compute applications 145 of all containers. In sum, the system kernel 120 may act similarly to a hypervisor that manages the compute operations of the various active containers. Based upon the request input by the user, the system kernel 120 may instruct the containers to perform a series of map functions, as well as a reduce functions. The map and reduce functions may be coordinated to produce the desired output specified in the request.

Turning to FIG. 3, after receiving a request from a user, the system kernel 120 may select a first set of containers, which includes container 125A from the pool of containers. This container 125A is assigned to a user. In response to receiving a request from a second user, the system kernel 120 may also select a second set of containers from the pool of containers.

Based upon the request received from the first tenant, the system kernel 120 may map the first set of containers to a plurality of objects, such as object 130, stored in the object store 110A. Likewise, the system kernel 120 may map a second set of containers to a plurality of different objects stored in the object store 110A for the second user. The objects and containers for the first user may be referred to as a compute zone of the first user, while the objects mapped to the container 125N may be referred to as a compute zone of the second user. The maintenance of compute zones allows the system kernel 120 to provide multitenant access to the object store 110A, even when the first and second users are potentially adversarial. For example, the first and second users may be commercial competitors. For security, the system kernel 120 maintains compute zones in order to balkanize object storage and prevent access to objects of other users. Additionally, the balkanization of object storage also ensures fair distribution of resources between users.

It will be understood that the system kernel 120 may maintain as many containers and compute zones as allowed by the processor(s) of the hardware layer 115. Additionally, the system kernel 120 assigns a container to a user on an as-needed basis, meaning that containers may not be assigned permanently to a user, which would result in a monopolization of resources when the user is not performing compute operations.

Figure 4:
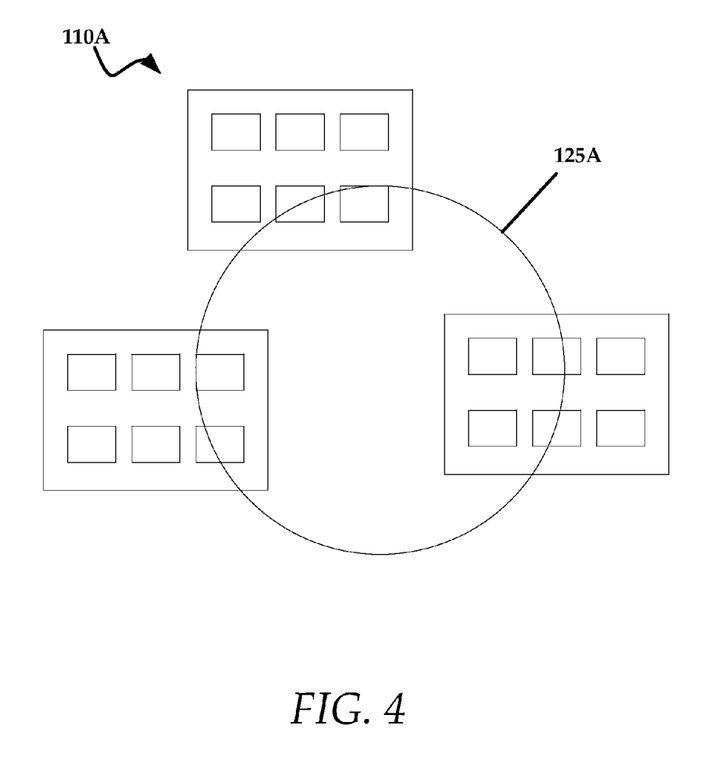
FIG. 4 is a schematic diagram of a guest virtual operating system container applied onto an object store.

FIG. 4 illustrates the placement of the container 125A onto the object store 110A. It is understood that the container 125A encircles a plurality of objects in the object store 110A. This mapping of multiple object to a single container would be commonly seen in a reduce phase, where the container is performing a concatenating or summation process on the outputs of individual containers, such as the containers shown in FIG. 3.

Additionally, because the container is placed onto the object store, the system kernel 120 need not transfer objects from the object store 110A into the container for processing in some exemplary embodiments. Advantageously, the container operates directly on the objects of the object store 110A.

According to some embodiments, the containers 125A-N managed by the system kernel 120 are empty when the containers 125A-N are in the pool. After objects are mapped to the container, compute operations may be executed by the container on the objects, and a desired output is generated, the system kernel 120 may clear the container and return the container to the pool.

In some instances, the system kernel 120 may not generate containers until a request is received from a user. That is, the system kernel 120 may "spin up" or launch containers when a request is received from the user. This allows for minimum impact to the bare metal resources, such as the CPU, as the system kernel 120 need not even maintain a pool of virtual operating system containers, which are awaiting user requests. That is, maintaining a pool of containers requires CPU and memory resources. When the compute operations have been completed, the system kernel 120 may terminate the containers, rather than clearing the containers and returning the containers to a pool.

Figure 5A:
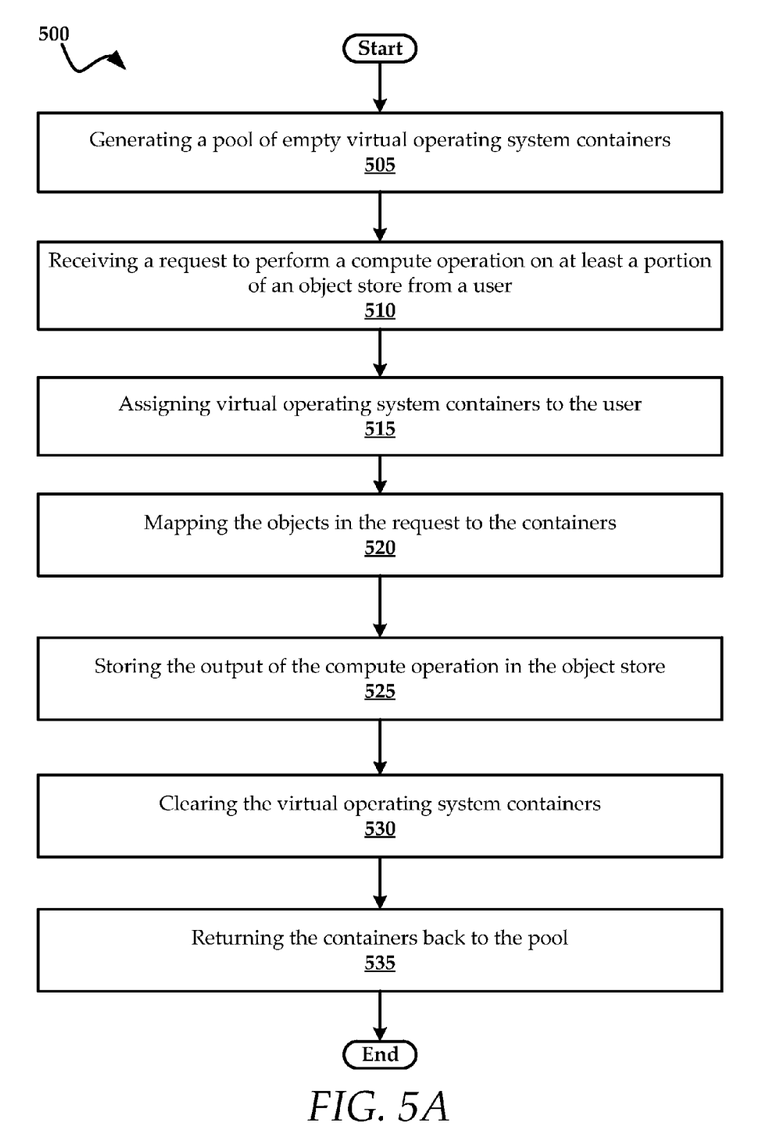
FIG. 5A is a flowchart of an exemplary method for providing a compute-centric object store.

FIG. 5A is a flowchart of an exemplary method 500 for providing a compute-centric object store. The method may comprise a step 505 of generating a pool of empty virtual operating system containers. These virtual operating system containers may be constructed as described above and are made available to a plurality of users.

The method comprises a step 510 receiving a request to perform a compute operation on at least a portion of an object store from a user. As mentioned above, the request identifies parameters of the compute operation and objects against which the compute operation is executed.

The method may also comprise a step 515 of assigning virtual operating system containers to the user. In some instances, the assigning of a virtual operating system may include a step of making a read-only instantiation of the object available to applications running inside the virtual operating system container. Using the parameters defined in the request, the system may inform compute applications of the containers in order to establish a schedule of operations that are to be performed on the objects specified in the request. The method also includes a step 520 of mapping the objects in the request to the containers.

Next, the method may include a step of performing the compute operation on the objects according to the identified parameters of the request, as well as a step 525 of storing the output of the compute operation in the object store. Additionally, the method may include a step 530 of clearing the virtual operating system containers, as well as a step 535 of returning the containers back to the pool.

It is noteworthy that the method may be repeated for multiple users, allowing for a plurality of containers to be collocated on the objects store and performing compute operations on the data store, even in an overlapping manner (e.g., multi-tenancy).

Figure 5B:
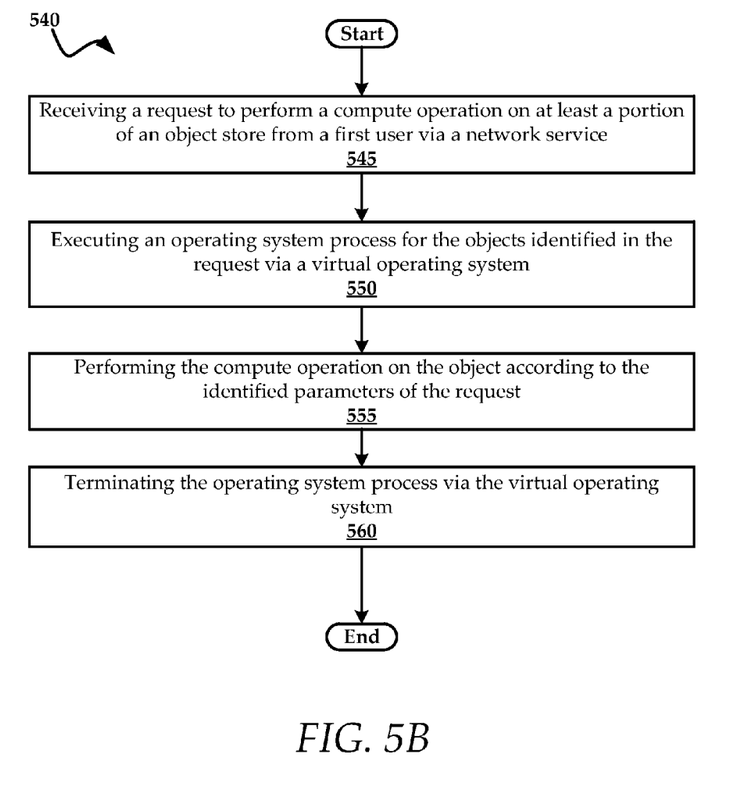
FIG. 5B is a flowchart of an exemplary method for executing compute operations within a compute-centric object store.

FIG. 5B is a flowchart of an exemplary method 540 for executing compute operations within a compute-centric object store. The method may include a step 545 of receiving a request to perform a compute operation on at least a portion of an object store from a first user via a network service. The request identifying parameters of a desired compute operation that is to be executed against an object(s) in the object store.

The method may also include a step 550 of executing an operating system process for the objects identified in the request via a virtual operating system, as well as a step 555 where the operating system process is performing the compute operation on the object according to the identified parameters of the request. Also, the method includes a step 560 of terminating the operating system process via the virtual operating system.

Figure 6:
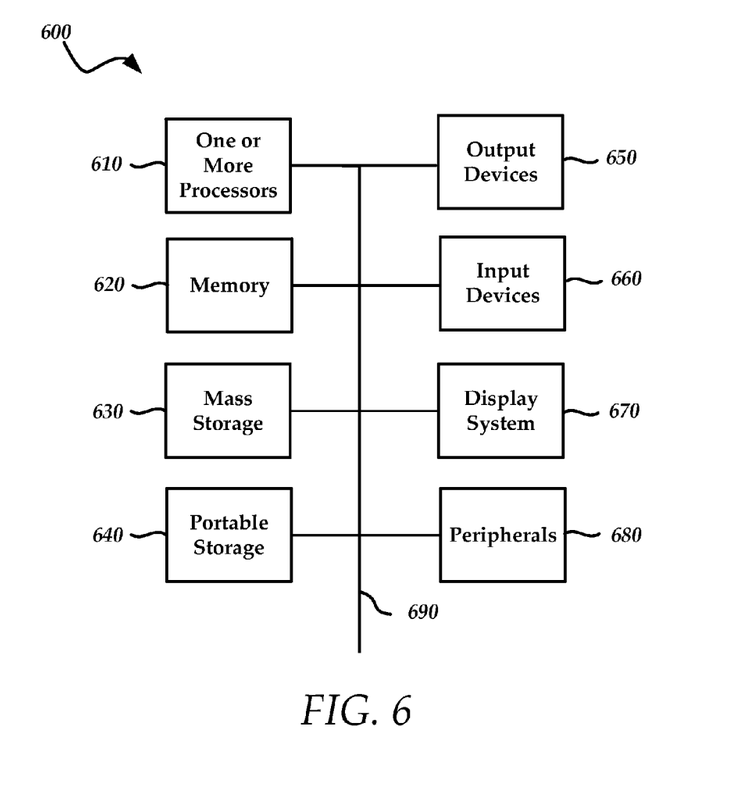
FIG. 6 illustrates an exemplary computing system that may be used to implement embodiments according to the present technology.

FIG. 6 illustrates an exemplary computing system 600 that may be used to implement an embodiment of the present systems and methods. The computing system 600 of FIG. 6 may be implemented in the contexts of the likes of computing systems, networks, servers, or combinations thereof. The computing system 600 of FIG. 6 includes one or more processors 610 and memory 620. Memory 620 stores, in part, instructions and data for execution by processor 610. Memory 620 may store the executable code when in operation. The computing system 600 of FIG. 6 further includes a mass storage device 630, portable storage device 640, output devices 650, user input devices 660, a display system 670, and peripheral devices 680.

The components shown in FIG. 6 are depicted as being connected via a single bus 690. The components may be connected through one or more data transport means. One or more processors 610 and memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by one or more processors 610. Mass storage device 630 may store the system software for implementing embodiments of the present technology for purposes of loading that software into memory 620.

Portable storage device 640 operates in conjunction with a portable non-volatile storage medium, such as a floppy disk, compact disk, digital video disc, or USB storage device, to input and output data and code to and from the computing system 600 of FIG. 6. The system software for implementing embodiments of the present technology may be stored on such a portable medium and input to the computing system 600 via the portable storage device 640.

User input devices 660 provide a portion of a user interface. User input devices 660 may include an alphanumeric keypad, such as a keyboard, for inputting alpha-numeric and other information, or a pointing device, such as a mouse, a trackball, stylus, or cursor direction keys. Additional user input devices 660 may comprise, but are not limited to, devices such as speech recognition systems, facial recognition systems, motion-based input systems, gesture-based systems, and so forth. For example, user input devices 660 may include a touchscreen. Additionally, the computing system 600 as shown in FIG. 6 includes output devices 650. Suitable output devices include speakers, printers, network interfaces, and monitors.

Display system 670 may include a liquid crystal display (LCD) or other suitable display device. Display system 670 receives textual and graphical information, and processes the information for output to the display device.

Peripherals device(s) 680 may include any type of computer support device to add additional functionality to the computer system. Peripheral device(s) 680 may include a modem or a router.

The components provided in the computer system 600 of FIG. 6 are those typically found in computer systems that may be suitable for use with embodiments of the present technology and are intended to represent a broad category of such computer components that are well known in the art. Thus, the computer system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system, comprising:
   one or more processors; and
   logic encoded in one or more tangible media for execution by the one or more processors to perform operations comprising:
      receiving a request to perform a compute operation on at least a portion of an object store from a first user, the request identifying parameters of the compute operation;
      assigning virtual operating system containers to objects of the object store from a pool of virtual operating system containers;
      the virtual operating system containers performing the compute operation on the objects according to the identified parameters of the request;
      clearing the virtual operating system containers;
      receiving a request to perform the compute operation on the at least a portion of the object store from a second user, the request identifying parameters of the compute operation, the objects of the second user included in the object store;
      assigning virtual operating system containers to objects of the second user, from the pool of virtual operating system containers;
      the virtual operating system containers performing the compute operation on the objects of the second user according to the identified parameters of the request; and
      clearing the virtual operating system container,
      wherein the virtual operating system containers are selected from the pool of virtual operating system containers managed by a global virtual operating system, and
      wherein the virtual operating system containers are returned to the pool of virtual operating system containers managed by the global virtual operating system after the virtual operating system containers have been cleared.

2. The system according to claim 1, wherein the one or more processors further execute the logic to perform operations comprising storing outputs of the virtual operating system containers in the object store.

3. The system according to claim 1, wherein the computation is expressed as input to a command line interpreter, wherein the request is received by a network service.

4. The system according to claim 1, wherein the virtual operating system containers perform the compute operation on the objects in such a way that the objects remain in situ within the object store.

5. The system according to claim 1, wherein the pool of virtual operating system containers is generated by the global virtual operating system.

6. The system according to claim 1, wherein the virtual operating system containers are terminated by the global virtual operating system.

7. The system according to claim 1, wherein the one or more processors further execute the logic to perform operations comprising mapping objects from the object store to the virtual operating system containers, based upon the request.

8. The system according to claim 1, wherein assigning comprises making a read-only instantiation of the object available to applications executing inside the virtual operating system container.

9. The system according to claim 1, wherein the compute operation comprises any operating system primitive operation, a user defined application, and any operation accessible to an operating system user.

10. A multitenant object storage system, comprising:
    a hardware layer associated with:
       one or more processors; and
       one or more tangible media; and
    a host operating system kernel encoded in the one or more tangible media,
       wherein the host operating system kernel performs:
          providing a pool of virtual guest operating systems;
          assigning a virtual guest operating system container of the pool of virtual guest operating systems to a first user of a plurality of users;
          mapping a plurality of objects for the first user to the virtual guest operating system; and
          performing a compute operation on the plurality of objects,
       wherein the host operating system kernel further performs:
          receiving a request to perform a compute operation on at least a portion of the object store from a second user, the request identifying parameters of the compute operation and objects against which the compute operation is executed, the objects included in the object store;
          assigning a second virtual operating system container which is mapped to objects for the second user;
          the second virtual operating system container performing the compute operation on the objects according to the identified parameters of the request;
          clearing the second virtual operating system container; and
          returning the second virtual operating system container to the pool of virtual guest operating systems.

11. The system according to claim 10, wherein the virtual guest operating system includes a virtual machine monitor that provides hardware emulation for the virtual guest operating system.

12. The system according to claim 11, wherein assignment of the virtual guest operating system comprises allocation of processing capacity of the one or more processors to the virtual guest operating system by the host operating system kernel.

13. The system according to claim 10, wherein the host operating system kernel is further configured to store an output of the compute operation in the object store.

14. The system according to claim 10, wherein the host operating system kernel is further configured to provide a command line interpreter that receives requests from a user.

15. The system according to claim 10, wherein the virtual guest operating system performs the compute operation on the objects in such a way that the objects are not moved from the object store.

16. The system according to claim 10, wherein the host operating system kernel maps objects from the object store to the virtual guest operating system.

17. The system according to claim 10, wherein the host operating system kernel assigns a virtual guest operating system by making a read-only instantiation of the object available to applications executing inside the virtual operating system container.

18. The system according to claim 10, wherein the compute operation comprises any of an operating system primitive operation, a user defined application, and any operation accessible to an operating system user.

19. A method, comprising:
- receiving, by a processor, a request to perform a compute operation on an object of an object store from a first user, the request identifying parameters of the compute operation;
- assigning, by the processor, virtual operating system containers to the objects of the object store from a pool of virtual operating system containers;
- the virtual operating system containers performing the compute operation on the objects according to the identified parameters of the request;
- clearing, by the processor, the virtual operating system containers;
- receiving, by the processor, a request to perform the compute operation on the at least a portion of the object store from a second user, the request identifying parameters of the compute operation, the objects of the second user included in the object store;
- assigning, by the processor, virtual operating system containers to objects of the second user, from the pool of virtual operating system containers;
- the virtual operating system containers performing the compute operation on the objects of the second user according to the identified parameters of the request; and
- clearing, by the processor, the virtual operating system containers,
- wherein the virtual operating system containers are selected from the pool of virtual operating system containers managed by a global virtual operating system, and
- wherein the virtual operating system containers are returned to the pool of virtual operating system containers managed by the global virtual operating system after the virtual operating system containers have been cleared.

\* \* \* \* \*